Sept. 30, 1958 D. PARRETT 2,854,112
FLUID PRESSURE-OPERATED CLUTCH
Filed April 22, 1955 3 Sheets-Sheet 1

INVENTOR.
Dent Parrett
BY
Robb & Cobb
ATTORNEYS

Sept. 30, 1958  D. PARRETT  2,854,112
FLUID PRESSURE-OPERATED CLUTCH
Filed April 22, 1955  3 Sheets-Sheet 2

INVENTOR.
Dent Parrett
BY
Robb & Robb
ATTORNEYS

Sept. 30, 1958 D. PARRETT 2,854,112
FLUID PRESSURE-OPERATED CLUTCH
Filed April 22, 1955 3 Sheets-Sheet 3

INVENTOR.
Dent Parrett
BY
Robert Cobb
ATTORNEYS

United States Patent Office 2,854,112
Patented Sept. 30, 1958

2,854,112

FLUID PRESSURE-OPERATED CLUTCH

Dent Parrett, St. Joseph, Mich., assignor, by mesne assignments, to Lambert Brake Corporation, St. Joseph, Mich., a corporation of Michigan Application April 22, 1955, Serial No. 503,156

1 Claim. (Cl. 192—85)

The present invention relates to fluid pressure operated clutches, and more particularly to an improved fluid pressure operated clutch which is so constructed and arranged as to embody certain relatively simple, yet effective principles which have not heretofore been available in friction clutches.

In certain previous clutch constructions, particularly of the self-energizing type, rather intricate actuator mechanisms have usually been resorted to, and at least one clutch plate has been fixedly mounted upon a power input or a power output member, while a cooperative pressure plate was mounted for axial and rotative movements relative to the fixed plate for shifting associated relatively rotatable friction elements into engagement. In certain types of previous self-energizing disc brakes, a relatively stationary inner double-disc assembly has been utilized, and such a double-disc assembly has proved to be quite simple, yet highly effective in producing a braking action on a rotatable member to be braked. While such a double-disc assembly has been widely used in mechanically and fluid operated brakes and has been used to some extent in mechanically actuated clutches, the adaptation of such a double-disc assembly for use in a fluid operated clutch has not heretofore been accomplished, because of the difficulties encountered in supplying operating fluid to the double-disc assembly in a clutch. Such difficulties arise primarily from the fact that in a clutch, the inner double-disc assembly must rotate and the discs must shift axially, whereas in a brake, the double-disc assembly is fixed against rotation, except for the slight amount of rotation required to permit self-energization of one disc or the other in a self-energizing brake. Accordingly, the provision of means for supplying actuating fluid under pressure to a relatively fixed inner double-disc brake assembly is comparatively simple, as distinguished from so mounting an inner double-disc assembly in a clutch construction that it rotates and the discs are free for axial movements, while providing means for supplying actuating fluid to the rotatable and axially shiftable double-disc assembly to operate the actuator means for the clutch.

With the foregoing in view, the primary object of the present invention is to provide a fluid operated clutch having a housing adapted to be rigidly connected to a rotatable element, said housing having axially spaced opposed friction surfaces therein, an inner double-disc assembly disposed between the friction surfaces of the housing and adapted to be connected to another rotatable element for axial shifting movement thereon and for rotation therewith, and fluid pressure operated means for shifting the discs of the inner double-disc assembly into engagement with the friction surfaces of the housing to transmit torque from one of said rotatable elements to the other. Preferably, the double-disc assembly is also provided with means for resiliently urging the discs towards one another to release the clutch when the operating fluid pressure is released. Also, the inner double-disc assembly is preferably provided with camming means between the discs, and one disc is preferably free for slight rotative movements relative to the other to effect self-energization of the clutch responsive to starting and operating loads on one of the rotatable members aforesaid.

In pursuance of this objective, at least one disc of the double-disc assembly is preferably in the form of an annular member having axially extended splines disposed in circumferentially spaced relation about its inner periphery, the rotatable member on which the double-disc assembly is mounted having mating splines, and the double-disc assembly being connected by the mating splines to said rotatable member for rotation therewith, while being free for axial shifting movements.

In conjunction with such a construction, a further object is to provide means for supplying pressure fluid, such as air or a liquid medium, axially through the rotary member on which the double-disc assembly is mounted and through the splined or other connection between the double-disc assembly and said rotary member, into a hydraulic actuator cylinder which is preferably formed by a particular structural relationship of the opposed faces of the respective discs of the double-disc assembly.

A further object is to provide such a clutch construction in which one disc is supported upon and carried by the other disc of the inner double-disc assembly, this being accomplished by resiliently connecting the discs together and biasing the discs towards one another, with a plurality of camming balls disposed therebetween, said balls seating in opposed, oppositely inclined ramped seats in the opposed inner faces of the discs. In such a construction, the balls act to concentrically support one disc on the other, under the pressure of the means biasing the discs towards one another, and the balls further act to force the discs axially apart responsive to relative rotation of the discs.

A clutch embodying the foregoing objective is simple to manufacture, maintain and repair, and in addition, requires less applied force to operate the clutch than previous fluid operated clutches.

In accordance with the objective of providing a clutch which is simple to maintain and repair, the discs of the double-disc assembly are preferably provided with friction lining segments which are independently replaceable, without necessitating disassembly of the inner double-disc assembly itself.

Other objects and advantages of the invention will be hereinafter described or will become apparent to those skilled in the art, and the novel features thereof will be defined in the appended claim.

Figure 3:
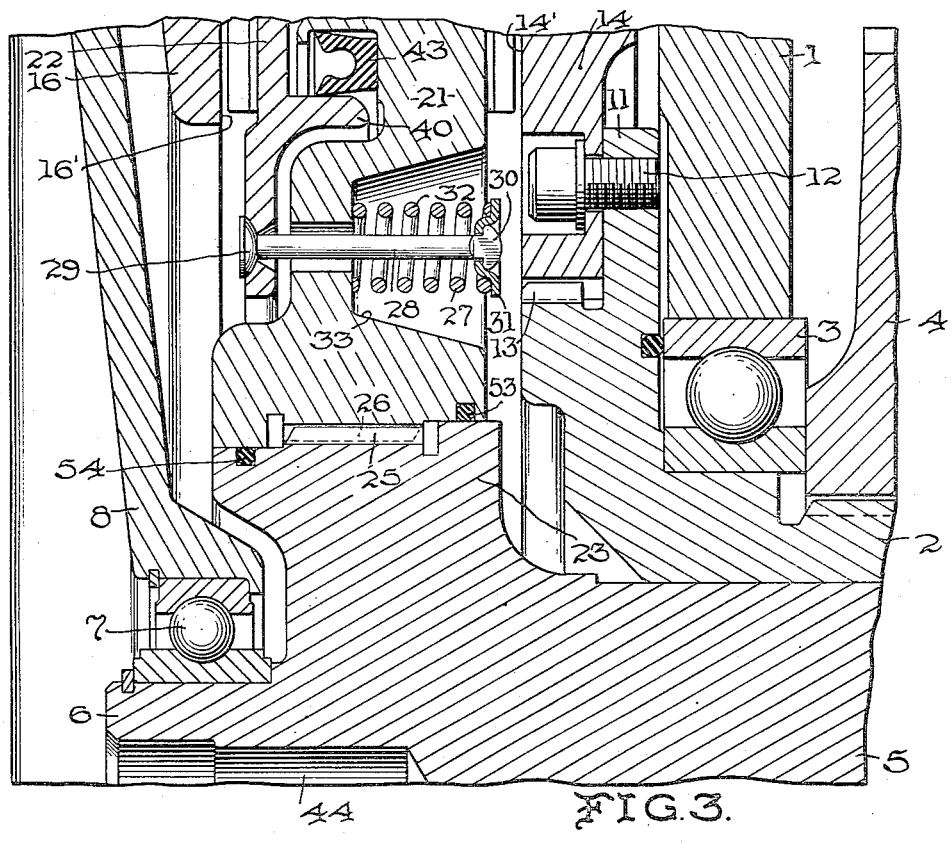
Figure 4:
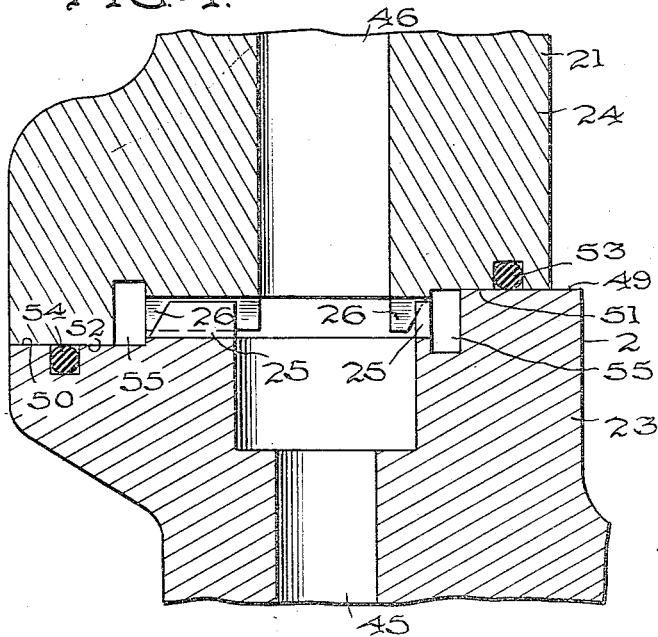

Fig. 3 is an enlarged fragmentary view in section, showing the connection of the inner double-disc assembly to a rotatable member and showing one of the springs for biasing the discs of the double-disc assembly together; and Fig. 4 is an enlarged fragmentary view in section, showing particularly the connection of the inner double-disc assembly to the rotatable member and the passages for the operating fluid through the connection.

Like reference characters in the several figures of the drawings and in the following description designate corresponding parts, wherein 1 generally denotes a side wall of a transmission case through which extends a hollow clutch input shaft or rotatable member 2, this member 2 being journalled in an opening in the case 1, as by means of a bearing assembly 3, and having splined thereon a driving bull gear 4 for imparting rotation to the clutch input member 2. Coaxially disposed in the hollow shaft 2 is an axially extended power output shaft or rotatable member 5 which projects laterally beyond the end of the input member 2. The output shaft 5 is preferably formed at its outer extremity with a central hub 6 on which is mounted the inner race of an anti-friction bearing 7, the outer race of the bearing 7 being disposed in a central opening in a radially extended, dome-like cover or casing 8, extended about the outer periphery of which is a radial flange 9 which is suitably secured to the transmission case 1, as by means of a suitable number of screws 10 or the like.

While the clutch assembly now to be described is for illustrative purposes shown as being applied to a hollow input shaft 2 and a coaxially extended countershaft 5 which is disposed within the hollow shaft 2, it is to be understood that the clutch is likewise applicable to other conventional arrangements of power input and output members, as will be apparent to those skilled in the art.

Secured to a radial flange 11 formed on the outer end of the hollow shaft 2, as by means of a suitable number of screws 12, and locked against relative rotation as by means of a splined connection at 13, is the inboard section 14 of an annular clutch housing 15 which is cupped in shape. The outboard section 16 of the clutch housing 15 is preferably removably fitted to the outer peripheral wall 17 of the housing section 14 as by means of a splined connection at 18, and the outboard section 16 of the housing is rigidly secured in place as by means of a retaining snap ring 19. Thus, the housing 15 constitutes a rotatable annular housing having therein opposed, axially spaced and radially extended friction surfaces 14' and 16' on its respective inboard and outboard sections 14 and 16.

Disposed between the inner friction surfaces 14' and 16' of the housing 15, there is an inner double-disc assembly generally designated 20, including an inboard disc 21 and an outboard disc 22. Adjacent to its outer end, the output shaft 5 is preferably formed with an enlarged radially projecting supporting hub 23, and the inner periphery of the inboard disc 21 of the double-disc assembly 20 is formed with an axially extended hub 24 which surrounds the hub 23 of shaft 5, and which is adapted to be connected to the hub 23, so as to support the inboard disc 21 on the output shaft 5 for rotation therewith and for axial shifting movements thereon. For this purpose, the outer periphery of hub 23 and the inner periphery of hub 24 are respectively provided with mating splines 25 and 26. The outboard disc 22 of the double-disc assembly 20 is preferably supported on the inboard disc 21 by means of a plurality of circumferentially spaced spring assemblies 27, one of which is best illustrated in Fig. 3. Each spring assembly 27 includes a spring retaining pin 28 which projects through aligned openings in the respective discs 21 and 22 and is provided at one end with a generally hemi-spherical head 29 which rockably seats in a corresponding depression in the outboard face of the outboard disc 22. The other end of the spring retaining pin 28 is provided with a slightly enlarged spring seat-retaining head 30 for removably retaining an annular spring seat 31 at this end of the pin, with a coiled compression spring 32 interposed between the spring seat 31 and the opposed surface of the inboard face of the inboard disc 21 and surrounding the pin 28. In order to accommodate the respective springs 32, the inboard disc 21 is preferably provided with generally conical recesses or depressions 33 in which the spring assemblies 27 are disposed.

Under the influence of the spring assemblies 27, the outboard disc 22 is centralized on the inboard disc 21 by a plurality of camming balls 34 which are interposed between the discs 21 and 22, each ball seating in a pair of oppositely disposed conical seats 35, 36 respectively formed in a pair of opposed inserts 37 and 38 mounted in opposing portions of the respective discs 21 and 22. Upon slight relative rotation between the discs 21 and 22, the balls 34 also serve to effect a powerful self-energization of the clutch.

Figure 2:
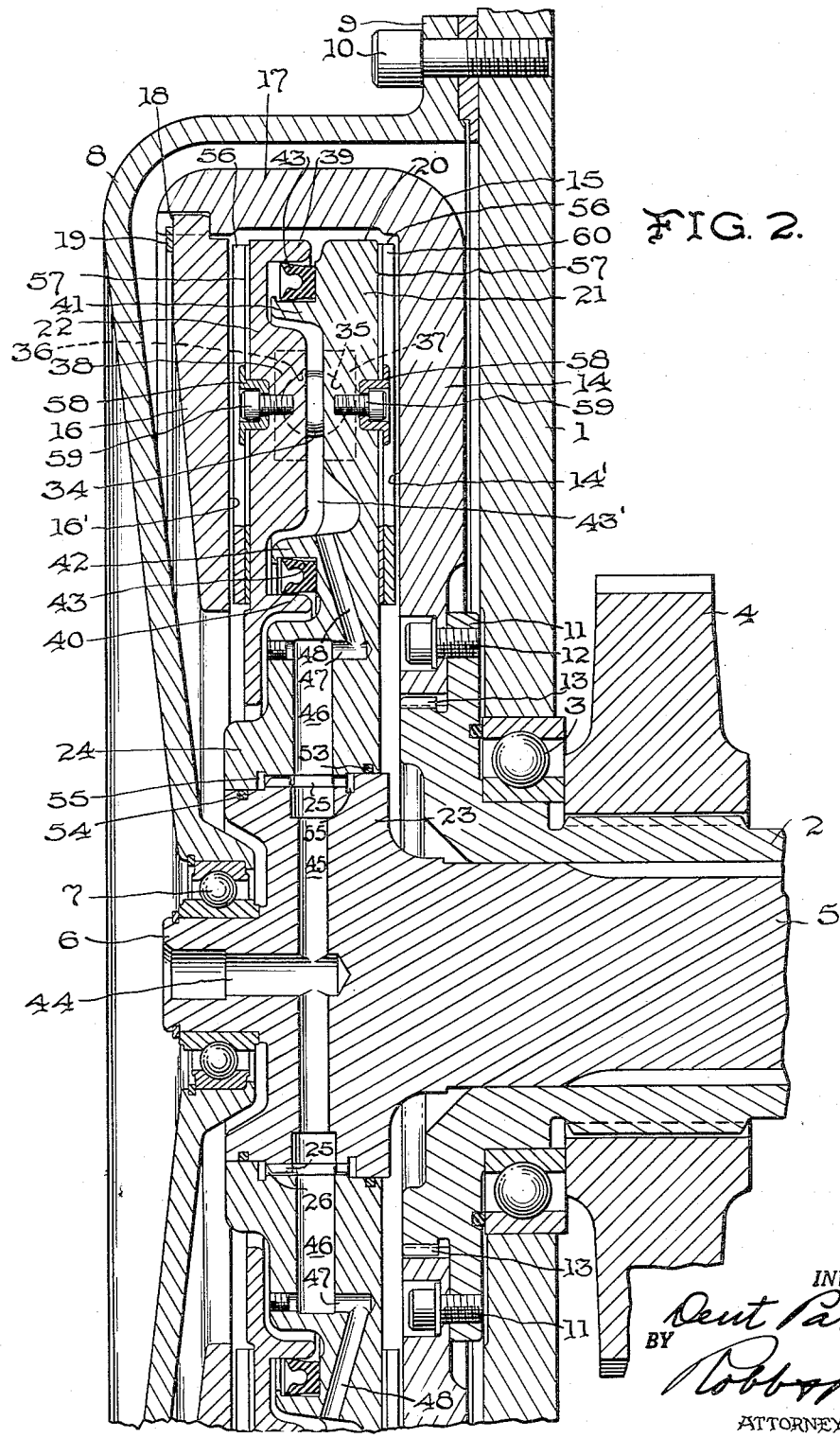
Fig. 2 is an enlarged fragmentary view in section, as taken on the line 2—2 of Fig. 1.

As is best illustrated in Fig. 2, the outboard disc 22 has an axially extended flange 39 formed about its outer periphery, and spaced radially inward from the flange 39 is a corresponding annular, axially extended flange 40, the flanges 39 and 40 projecting towards the inboard disc 21. The inboard disc 21 is also provided with an annular, axially extended flange 41 formed adjacent to its outer periphery and projecting towards the outboard disc 22 in radially inwardly spaced relation to the flange 39 of the latter disc, and the inboard disc 21 is also formed with a second annular, axially extended flange 42 which is disposed in radially outwardly spaced relation to the flange 40 on the outboard disc 22. Interposed between the flanges 39 and 41 and between the flanges 40 and 42 on the outboard and inboard discs 22 and 21, respectively, is a pair of annular seals 43, 43. These seals 43 are preferably made of resilient material and are of a well-known type which are caused to expand slightly to enhance their sealing action, responsive to fluid pressure. Accordingly, it will be seen that intermediate the seals 43, 43, an annular pressure chamber 43' is defined between the discs 21 and 22 of the inner double-disc assembly, said chamber constituting an annular actuator cylinder by means of which the discs may be shifted axially apart by supplying fluid under pressure to the annular actuator cylinder.

In order to supply operating fluid to the annular actuator cylinder defined between the discs, the power output shaft 5, at its central axis, is provided with an axially extended fluid conduit or passage 44 which communicates with a diametrically extended passage 45. The passage 45 communicates with a pair of diametrically opposed, radially extended passages 46, 46 formed in the hub 24 of the inboard disc 21. At diametrically opposite points adjacent to the outer extremity of each passage 46 in the inboard disc 21, this disc is preferably bored to form parallel, axially extended passages 47, 47 which connect the passages 46 with a pair of inclined passages 48, 48 in the inboard disc 21, the latter passages communicating with the annular actuator cylinder 43' between the discs 21 and 22. It will be noted that the fluid passages formed in the hub 23 of the power output shaft 5 and the hub 24 of the inboard disc 21 are in communication with one another through the splines 25 and 26 which are respectively formed on the outer and inner peripheries of these hubs.

To prevent leakage of actuating fluid through the connection between the inboard disc 21 and the output member 5, the hub 23 of the output member 5 is preferably formed with a pair of axially extended and axially spaced annular surfaces 49 and 50 located adjacent to the opposite ends of the splines 25 thereon, as best illustrated in Fig. 4. Closely fitting the annular surfaces 49 and 50 is a pair of mating annular surfaces 51 and 52 formed on the inner periphery of the inboard disc 21 adjacent to the opposite ends of the splines 26 thereon. Suitable seals are provided for preventing the passage of operating fluid between the annular surfaces 49 and 51 and the annular surfaces 50 and 52, respectively, and preferably, such seals are in the form of resilient O-rings designated 53 and 54, respectively. At the opposite ends of the splines 25 and 26 on the hubs 23 and 24 of the output member 5 and the inboard disc 21, the hubs are preferably formed with complemental annular depressions which, when the hubs are in assembled relation, define a pair of annular fluid chambers 55, 55 at opposite ends of the splined connection. When a liquid operating fluid is being utilized, it will be understood that the liquid will fill the annular chambers 55, 55 and lubricate all of the splines 25 and 26, so as to assure easy movement of the inboard disc 21 on the output member 5 in an axial direction during actuation and release of the clutch. However, such lubrication is not essential, and air is an equally effective and serviceable operating fluid medium.

Figure 1:
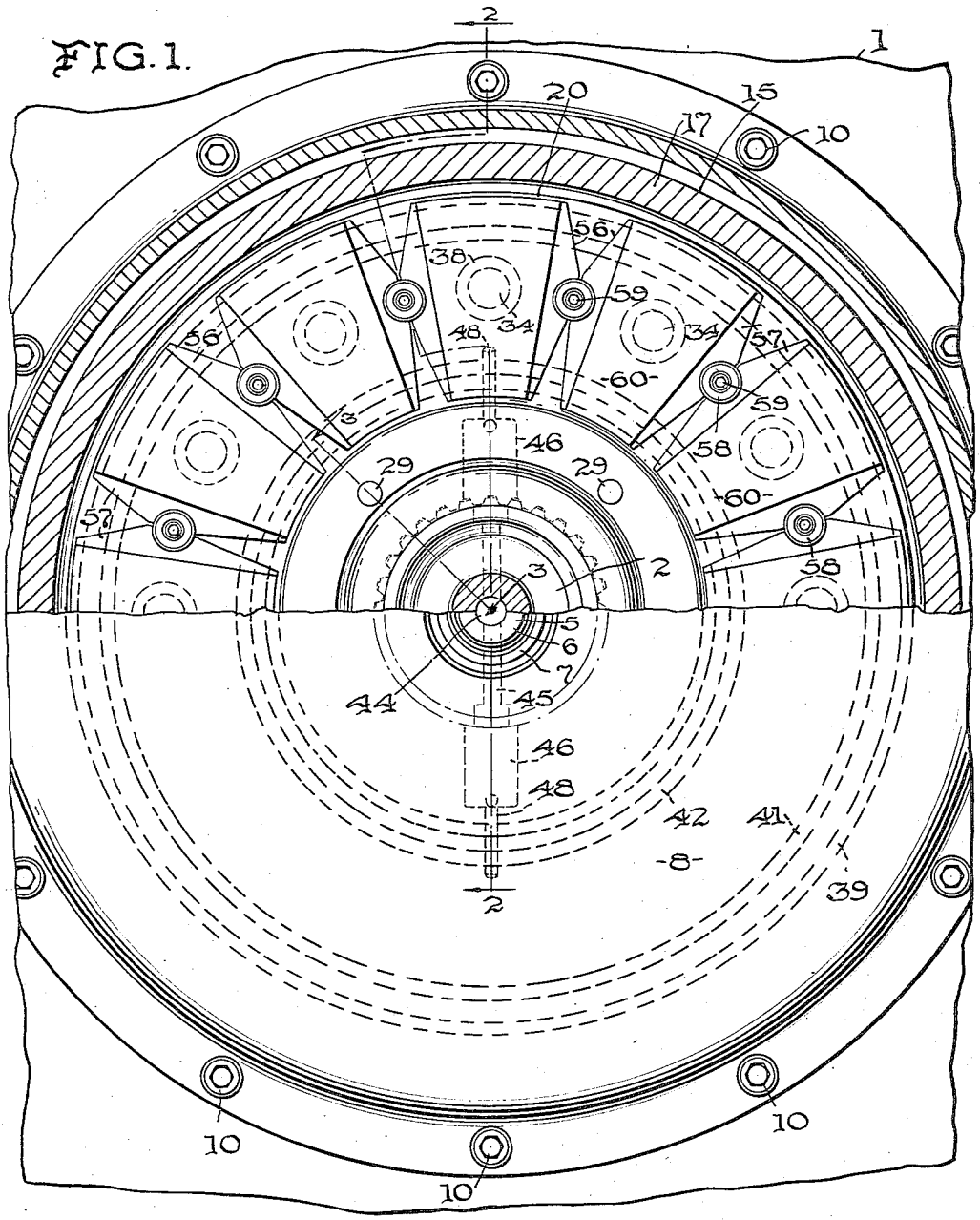
Fig. 1 is a view, partly in elevation, of a clutch embodying the invention, with the upper half of the outer cover and the disc housing broken away to expose the upper portion of the inner double-disc assembly in elevation.

In order to facilitate maintenance and service of the clutch, the discs 21 and 22 of the inner double-disc assembly 20 are each preferably provided on their surfaces that are opposed to the friction surfaces 14' and 16' in the housing 15 with a plurality of circumferentially spaced, identical friction lining units generally designated 56. Each friction lining unit 56 preferably comprises a friction lining supporting base plate 57 which is polysided in outline and tapers in width toward both its inner and outer marginal edges and the base plates 57 are disposed in side-by-side relationship about the discs 21 and 22 and are secured on the respective inboard and outboard faces of the discs by means of a plurality of anchor elements. These anchor elements each include a cupped washer 58 having its central portion seated in a corresponding depression in the respective discs 21 and 22, and the head of a screw or other fastener 59 is seated in the central depressed portion of each of the washers 58 when the lining units are attached to the discs. As is best illustrated in Fig. 1, each friction lining base plate 57 projects at its widest point into contiguous relation to each adjacent plate 57, and the washers are each provided with a marginal flange overlying the adjacent edges of a pair of adjacent plates 57, so that each washer 58 serves to secure the adjacent sides of a pair of such plates 57. In addition, the plates are preferably notched or recessed at their widest points for receiving the cupped portion of the anchor washers. Suitably secured on the outer face of each of the base plates 57 is a friction lining sector or segment 60, these lining segments 60 preferably being bonded to the supporting plates 57. Accordingly, the friction lining surfaces of the clutch are constituted by a plurality of independently replaceable friction lining units which are readily removable from the inner double-disc assembly 20, without necessitating disassembly of the disc assembly itself.

In operation, operating fluid under pressure will be supplied through the passage 44 at the axis of the power output member 5, and will flow in diametrically opposed directions through passage 45 into passages 46, 47 and 48 into the annular actuator cylinder 43' between the discs 21 and 22, so as to shift the discs 21 and 22 axially apart and into engagement with the opposed faces 14' and 16' of the rotary housing 15. Thus, torque will be transmitted through the housing 15 and the inner double-disc assembly 20 from the power input or rotatable member 2 to the power output or rotatable member 5. When either the starting or the operating load on the output member 5 tends to cause slippage of the double-disc assembly 20 relative to the housing 15, the outboard disc 22 will rotate slightly relative to the inboard disc 21, thereby causing the balls 34 to climb the opposed ramps 35 and 36 to effect a powerful self-energization of the clutch which positively precludes slippage thereof.

In view of the foregoing, it should be recognized that there has been provided a relatively simple friction clutch in which the actuator means for the clutch, in effect, constitutes the friction discs therefor, thus effecting a substantial saving of space, but without any attending sacrifice in the torque capacity of the clutch. In addition, the clutch will require substantially less applied force to actuate the same than has been required in previous clutches, due in part to the relatively large surface of the annular actuator cylinder between the discs which is subject to the applied force of the operating fluid.

While the specific details of the invention have been herein shown and described, changes and alterations may be resorted to without departing from the spirit thereof as defined in the appended claim.

I claim:

A friction device of the class described, comprising a rotatable power input element, a rotatable power output element, a member rigidly connected to one of said power elements for rotation therewith and having axially spaced opposed friction surfaces, an inner double-disc assembly disposed between said friction surfaces, with one disc of said double-disc assembly supported by the other and resiliently biased toward one another, a pair of annular fluid sealing means between the discs of said double-disc assembly, said sealing means being concentrically disposed with respect to the central axis of the double-disc assembly and being radially spaced from each other, cooperative camming means confined between the discs and centralizing one disc on the other, one disc of said double-disc assembly and the other of said power elements having axially extended mating splines for connecting the double-disc assembly to the latter power element for rotation therewith and for axial movements of the double-disc assembly on the latter power element, fluid pressure responsive actuator means for shifting the discs of said double-disc assembly axially apart and into engagement with the opposed friction surfaces of the member aforesaid, one of the discs of the double-disc assembly and the rotatable element with which it is connected having fluid passages extending through the splines aforesaid and communicating with said actuator means for directing fluid under pressure to said actuator means from a source of actuator fluid, the splined disc of the double-disc assembly and the splined power element with which it is connected have sealing means disposed therebetween at the opposite ends of the splines, and said splined disc and splined power element also defining continuous circumferentially extended fluid chambers at the opposite ends of the splines.

References Cited in the file of this patent

UNITED STATES PATENTS

| | | |
|---|---|---|
| 1,702,000 | Gibson et al. | Feb. 12, 1929 |
| 2,253,316 | Armitage | Aug. 19, 1941 |
| 2,299,387 | Groll | Oct. 20, 1942 |
| 2,361,120 | Peterson | Oct. 24, 1944 |
| 2,375,854 | Lambert | May 15, 1945 |
| 2,570,641 | Carnagua et al. | Oct. 9, 1951 |
| 2,684,737 | Johansson | July 27, 1954 |

FOREIGN PATENTS

| | | |
|---|---|---|
| 410,285 | Germany | Mar. 7, 1925 |
| 900,094 | France | Sept. 18, 1944 |
| 446,084 | Italy | Mar. 8, 1949 |